(12) United States Patent
Claus et al.

(10) Patent No.: US 9,894,311 B2
(45) Date of Patent: Feb. 13, 2018

(54) ADAPTIVE METHODS FOR WIRELESS CAMERA COMMUNICATION

(71) Applicants: ROBERT BOSCH GMBH, Stuttgart (DE); Christopher Claus, Renningen (DE); Vivek Jain, Mountain View, CA (US); Abtin Keshavarzian, Mountain View, CA (US); Martin Schaut, Moglingen (DE); Fred Sejalon, Commerce Township, MI (US); Lakshmi Venkatraman, Mountain View, CA (US)

(72) Inventors: Christopher Claus, Renningen (DE); Vivek Jain, Mountain View, CA (US); Abtin Keshavarzian, Mountain View, CA (US); Martin Schaut, Moglingen (DE); Frederic Marcel Sejalon, Commerce Township, MI (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 14/908,431

(22) PCT Filed: Jul. 30, 2014

(86) PCT No.: PCT/US2014/048896
§ 371 (c)(1),
(2) Date: Jan. 28, 2016

(87) PCT Pub. No.: WO2015/017541
PCT Pub. Date: Feb. 5, 2015

(65) Prior Publication Data
US 2016/0173805 A1    Jun. 16, 2016

Related U.S. Application Data

(60) Provisional application No. 61/860,058, filed on Jul. 30, 2013.

(51) Int. Cl.
*H04N 5/44* (2011.01)
*G06T 3/40* (2006.01)
(Continued)

(52) U.S. Cl.
CPC ............. *H04N 5/44* (2013.01); *B60R 1/00* (2013.01); *G06T 3/40* (2013.01); *H04N 5/23245* (2013.01);
(Continued)

(58) Field of Classification Search
None
See application file for complete search history.

(56) References Cited

U.S. PATENT DOCUMENTS

| 2005/0089091 | A1 | 4/2005 | Kim et al. | |
|---|---|---|---|---|
| 2008/0165246 | A1* | 7/2008 | Jung | H04N 7/141 348/14.12 |

(Continued)

FOREIGN PATENT DOCUMENTS

| EP | 2 270 994 A2 | 1/2011 |
|---|---|---|
| EP | 2530997 A1 | 12/2012 |

OTHER PUBLICATIONS

International Search Report corresponding to PCT Application No. PCT/US2014/048896, dated Nov. 10, 2014 (4 pages).
(Continued)

*Primary Examiner* — Kate Luo
(74) *Attorney, Agent, or Firm* — Maginot Moore & Beck LLP

(57) ABSTRACT

In a wireless transmission system, a transmitter sends a plurality of data packets to a receiver. The transmitter identifies channel quality indicators corresponding to properties of a communication channel between the transmitter and the receiver. During operation, the transmitter adjusts one or more parameters that affect the Quality of Service
(Continued)

(QoS) of data transmission between the transmitter and receiver to enable data transmission at different quality levels over a range of channel quality levels. In one embodiment, the transmitter sends data packets corresponding to video from a camera to the receiver.

9 Claims, 4 Drawing Sheets

(51) Int. Cl.
H04N 7/01 (2006.01)
B60R 1/00 (2006.01)
H04N 5/232 (2006.01)
H04N 17/00 (2006.01)
H04N 21/238 (2011.01)
H04N 21/24 (2011.01)
H04N 21/647 (2011.01)
H04N 21/414 (2011.01)
H04N 21/4223 (2011.01)
H04N 21/4363 (2011.01)
H04N 21/4402 (2011.01)
H04N 21/442 (2011.01)
H04N 21/45 (2011.01)

(52) U.S. Cl.
CPC ....... H04N 5/23293 (2013.01); H04N 7/0127 (2013.01); H04N 17/004 (2013.01); H04N 21/23805 (2013.01); H04N 21/2402 (2013.01); H04N 21/41422 (2013.01); H04N 21/4223 (2013.01); H04N 21/43637 (2013.01); H04N 21/44227 (2013.01); H04N 21/440263 (2013.01); H04N 21/440281 (2013.01); H04N 21/4524 (2013.01); H04N 21/64723 (2013.01); G06T 2207/30252 (2013.01)

(56) References Cited

U.S. PATENT DOCUMENTS

2010/0098047 A1 4/2010 Zhou et al.
2011/0150287 A1 6/2011 Flosdorf et al.
2012/0079329 A1 3/2012 Steinbach et al.
2012/0250762 A1 10/2012 Kaye et al.
2013/0147973 A1 6/2013 Williams et al.

OTHER PUBLICATIONS

Adaptive Bitrate Streaming, Wikipedia, The Free Encyclopedia, printed on Jul. 23, 2014, available at least as early as Jul. 29, 2013 (4 pages).
Nam et al., Towards a Dynamic QoS-aware Over-The-Top Video Streaming in LTE, Columbia University Computer Science Technical Reports, 2013 (9 pages).
Dynamic Adaptive Streaming over HTTP, Wikipedia, The Free Encyclopedia, printed on Jul. 23, 2014, available at least as early as Jul. 29, 2013 (4 pages).
Stockhammer et al., Dynamic Adaptive Streaming over HTTP—Design Principles and Standards, Proceeding, MMSys '11 Proceeding of the Second Annual ACM Conference on Multimedia Systems, 2011 (3 pages).
Supplementary Partial European Search Report corresponding to European Patent Application No. 14 83 2269 (8 pages).

* cited by examiner

# ADAPTIVE METHODS FOR WIRELESS CAMERA COMMUNICATION

CLAIM OF PRIORITY

This application is a 35 U.S.C. § 371 National Stage Application of PCT/US2014/048896, filed on Jul. 30, 2014, which claims the benefit of priority to U.S. Provisional Application No. 61/860,058, which is entitled "Adaptive Methods For Wireless Camera Communication," and was filed on Jul. 30, 2013. The disclosures of the above-identified patent applications are both incorporated by reference herein in their entirety.

TECHNICAL FIELD

This disclosure relates generally to the field of wireless communication, and more particularly, to systems and methods for transmitting and receiving frames of video data using wireless communication devices.

BACKGROUND

Video monitoring and display systems are used in a wide range of applications including in driver assistance systems for motor vehicles. Some vehicles are equipped with video cameras at various locations in the vehicle to assist a vehicle operator in viewing regions around the vehicle that are otherwise difficult to see. For example, a backup camera mounted at the rear of the vehicle generates a video of the region behind the vehicle and an in-vehicle video display presents the view to the vehicle operator. The video from the in-vehicle camera often shows so-called "blind spots," which are portions of the area behind the vehicle that are not readily seen through conventional windows or mirrors. The camera systems provide additional visibility to the vehicle operator to reduce or eliminate blind spots while the vehicle is in operation.

Some in-vehicle video systems send video data from a camera to a video display device through a wired communication medium in the vehicle. Other video systems transmit video data from a camera using a wireless transceiver that sends the video data to another wireless transceiver that is connected to the video display device. Some wireless video monitoring systems are used as after-market video monitoring systems for vehicles that did not receive a video monitoring system at the time of manufacture. Other wireless video monitoring systems are included in new vehicles to reduce the complexity of running data wires in the vehicle and to enable transmission of video data to portable electronic devices such as smartphones, tablet computers, and other portable electronic devices that are available to the vehicle operator.

Wireless communication systems for transmission of video data in a motor vehicle can provide additional information to a vehicle operator during operation of the motor vehicle, but the environment and operating requirements for a motor vehicle present challenges to the design of wireless video transmission systems. While numerous systems for transmission of video data over wired and wireless networks, including streaming data using H.264 compression or other temporal compression schemes are known to the art, the existing video streaming systems are not always suitable for use in motor vehicle systems that require rapid real time presentation of images that are generated by backup cameras or other cameras in the vehicle. For example, video streaming and compression systems typically generate segments of video in a short duration, such as a few seconds, and then encode each video segment using inter-frame compression techniques. That is to say, the compression process analyzes data from multiple frames of recorded video data that occur over a predetermined period of time and generates compressed data where the decompression process for some frames of video require the prior decompression of previous frames in the video sequence. Video compression and streaming techniques that are known to the art, even so-called "live" video streams such as two-way video communication and camera monitoring systems, commonly compress segments of several video frames and use buffering techniques to provide smooth video playback. Buffering occurs when a receiving device receives multiple frames of video prior to displaying the video frames to ensure that the playback of video remains smooth even if a transient interruption in network service delays transmission for portions of the video.

While buffering is an effective technique for many video streaming systems, existing buffering techniques can be less effective for use with backup cameras or other cameras that show present-time conditions around the vehicle with minimal time delay for display of the images from the in-vehicle cameras. Additionally, motor vehicles often operate in electrically noisy environments with transient electrical noise sources that affect the video data stream in unpredictable ways during operation.

During operation of the motor vehicle, the wireless video transmission system should operate with high reliability to ensure that the vehicle operator can view an accurate depiction of the video from the in-vehicle camera, even in the presence of interference. Consequently, improvements to wireless transmission systems and methods to enable reliable transmission of video data for a wide range of operating conditions in and around the vehicle would be beneficial.

SUMMARY

A method of operating a wireless communication includes Quality of Service (QoS) parameter adjustment that accounts for changes in channel quality indicators (CQI) to maintain reliable transmission of a continuous stream of data, such as video data. The method adjusts varying Quality of Service (QoS) parameters such as frame rate, video resolution, and encoding quality to maintain the video stream under varying operating conditions. The method also adjusts radio parameters such as power, frequency/code, packet size, data rate, and packet retransmission attempts to maintain a selected QoS level. The method adjusts the parameters for the wireless communication system to enable streaming of data under different interference and bandwidth limiting conditions. The method includes adjustments to operating parameters in either or both of a transmitter and receiver in the wireless communication system.

In one embodiment, a method of operating an in-vehicle video monitoring system has been developed. The method includes generating with a camera in a vehicle a first image frame of an environment exterior to the vehicle, the first image frame having a first resolution and first image quality level, transmitting with a transmitter operatively connected to the camera the first image frame to a receiver through a wireless channel, generating with the camera in the vehicle a second image frame of the environment exterior to the vehicle, the second image frame having the first resolution and first image quality level, the second image being generated after generation of the first image frame and after the transmitter beings transmitting the first image frame to the receiver, transmitting with the transmitter operatively connected to the camera the second image frame to the receiver through the wireless channel after the first image frame is transmitted to the receiver, displaying with a display device in the vehicle the first image frame and the second image frame received by the receiver, the second image frame being displayed after the first image frame, identifying with a controller operatively connected to the receiver a plurality of channel quality indicators; generating with the controller a command to reduce at least one of a frame transmission rate, frame resolution, and frame quality level for a subsequent frame from the camera in response to at least one of the plurality of channel quality indicators being beneath a predetermined quality threshold, transmitting with the receiver the command to the transmitter and the camera, and transmitting with the transmitter a third image frame from the camera a second selected frame rate that is less than the first selected frame rate in response to the command. The identification of the plurality of channel quality indicators includes identifying an average frame rate corresponding to the received transmissions of the first and second images, identifying, a first ratio corresponding to an average frame transmission time for the first image frame and the second image frame to a constant time interval for frame transmission corresponding to a first selected rate of frame transmission from the transmitter, and identifying a second ratio corresponding to a sum of the average frame transmission time with an average channel access delay for the first image frame and the second image frame to the constant time interval.

DETAILED DESCRIPTION

Figure 1:
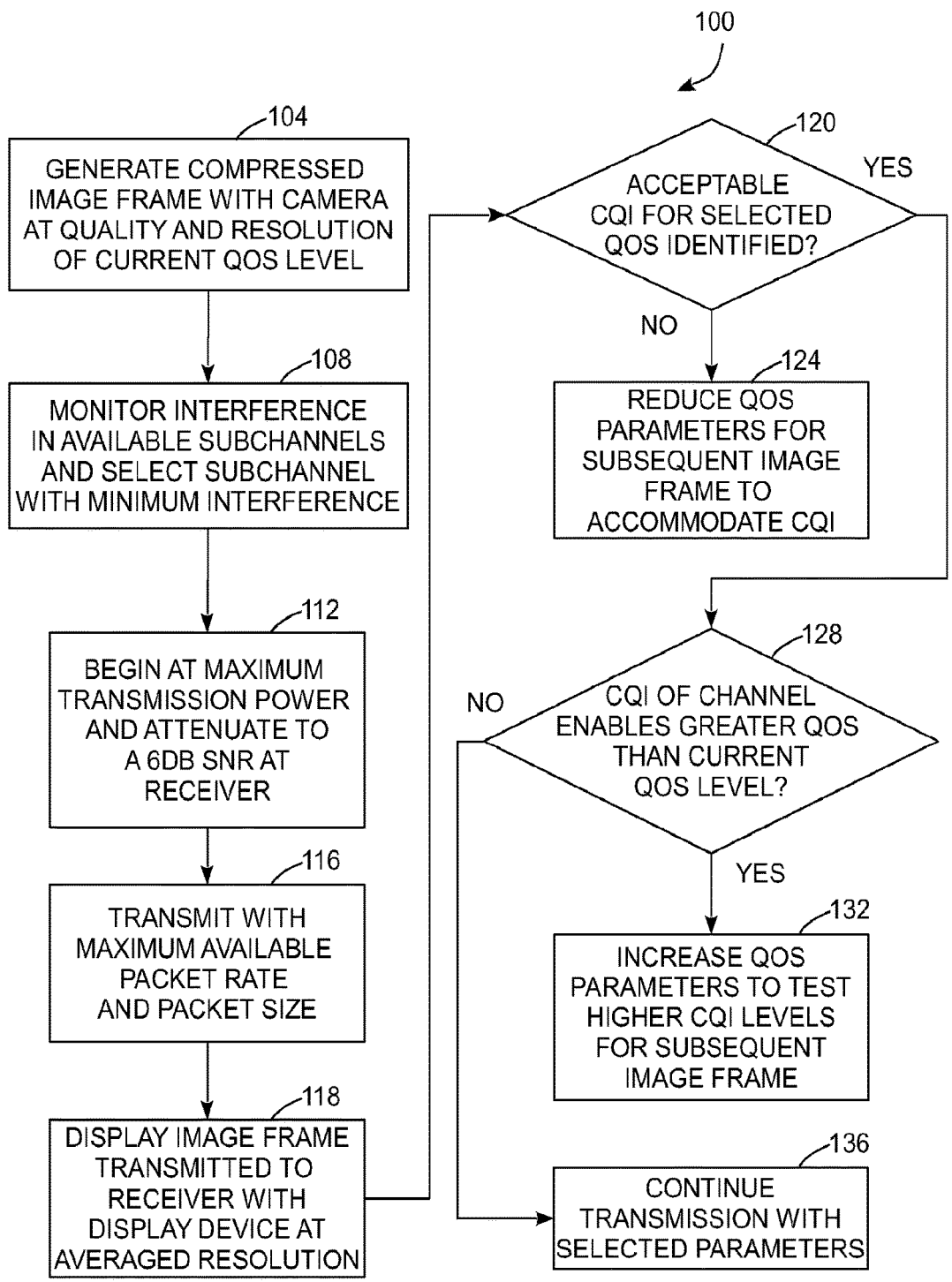
FIG. 1 is a block diagram of a process for adjusting operating parameters in a wireless communication system to adjust Quality of Service (QoS) levels for different Channel Quality Indicators that are identified in a wireless communication channel used by the wireless communication system.

For the purposes of promoting an understanding of the principles of the embodiments described herein, reference is made to the drawings and descriptions in the following written specification. No limitation to the scope of the subject matter is intended by the references. The description also includes any alterations and modifications to the illustrated embodiments and includes further applications of the principles of the described embodiments as would normally occur to one skilled in the art to which this document pertains.

As used herein, the terms "good," "acceptable," and "bad" as used in reference to the channel quality indicators that are described below refer to conditions of a communication channel that either permit or prevent efficient transmission of data, such as video data, between a transmitter and receiver. More particularly, a "good" channel condition enables transmission of video data at a predetermined frame rate, quality, and resolution with potential for increases to one or more of the rate, quality and resolution metrics by a transmitter. For example, under "good" conditions a transmitter that is successfully transmitting video at a first resolution (e.g. 640×480 pixels per frame) can increase the resolution of transmitted video while remaining within the constraints of the channel (e.g. increase resolution to 1280× 720 pixels). Under "acceptable" channel conditions, the transmission of video occurs at predetermined frame rate, resolution, and quality levels, but the state of the channel prevents the transmitter and receiver from streaming video at maximum frame rate, resolution, and quality levels that are otherwise permitted by the available hardware systems. For example, a video transmitter that records video at 30 frames per second and a resolution of 1920×1080 pixels can transmit at a rate of 15 frames per second with 1280×720 pixels frames under "acceptable" channel conditions, but the conditions may not enable the transmitter to operate at the maximum frame rate and resolution levels that are enabled in the hardware. Under "bad" channel conditions, the transmitter cannot maintain at least one parameter of the transmission, such as the resolution, frame rate, or image quality. However, if the transmitter reduces at least one of the parameters, the "bad" channel may be able to accommodate transmission of the video at the reduced parameter level.

As used herein, the terms "optimal," "operable," and "inoperable" refer to quality of service (QoS) parameter for a video transmission from a transmitter to a receiver through a communication channel. An "optimal" QoS parameter refers to operation of the transmitter to transmit a sequence of video frames with quality of service parameters, such as frame rate, resolution, and image quality, which are within a predetermined range of the maximum video quality that the video recording hardware is capable of recording. When operating the "operable" range, the transmitter transmits video frames with parameters that enable a receiver to display the video, but at a reduced quality of service level from the optimal range, such as displaying the video with a reduced frame rate, resolution, or image quality. Under "inoperable" conditions, the quality of service parameter indicates that the video sequence cannot be transmitted to the receiver at a minimum predetermined quality level. For example, if noise in a channel prevents transmission of video data at a predetermined minimum frame rate, resolution, or image quality level, then the quality of service is identified as being inoperable. As described below, in some instances a reduction in one QoS parameter, such as the image quality metric, can increase another QoS metric that is in the inoperable range, such as the frame rate, so that all of the QoS parameters for the transmission of the image data are in the "operable" range.

As used herein, the term "channel quality" refers to any property of a communication channel that affects the ability of a transmitter to send data or a receiver to receive data through the channel. Examples of channel quality properties include, but are not limited to, noise levels, signal interference, multipath, and signal attenuation in the channel. As used herein, the term "Channel Quality Indicator" (CQI) refers to one or more parameters corresponding to properties of the channel that affect the ability of the transmitter to send data, such as a sequence of frames in a video transmission, to the receiver. In a wireless communication system, the transmitter and receiver test the channel to identify the CQI. The CQI of a wireless channel often changes over time due to changes in noise sources and other sources of signal interference. In an in-vehicle wireless system, the CQI of the channel also changes based on the operating state of the vehicle and the environment around the vehicle as the vehicle moves. Table 1 depicts examples of channel quality indicators threshold values in an approximate spectrum of "good" quality, "acceptable" quality, and "bad" quality for an example wireless communication system. The identified CQI for the channel is the minimum level of "good", "acceptable," or "bad" quality levels for any of the quality indicators that are listed below. The exact parameter numbers that are listed in Table 1 are merely illustrative of parameters that are one embodiment of an in-vehicle wireless video transmission system, and alternative embodiments can use different threshold values to delineate good, acceptable, and bad channel quality indicators.

TABLE 1

Channel Quality Indicator Parameters

| Parameter | Range | Channel Quality |
|---|---|---|
| Received Frame Rate = 1/(Average Frame Reception Interval) | ≥25 | Good |
| | ≥20 and <25 | Acceptable |
| | <20 | Bad |
| (Average Frame Transmission Time)/ (Constant Frame Transmission Interval) | ≤0.33 | Good |
| | >0.33 and ≤0.66 | Acceptable |
| | >0.66 | Bad |
| (Average Frame Transmission Time + Average Channel Access Delay)/ (Constant Frame Transmission Interval) | ≤0.5 | Good |
| | >0.5 and ≤0.75 | Acceptable |
| | >0.75 | Bad |
| Frame Drop Rate | <1% | Good |
| | 1> and <10% | Acceptable |
| | >=10% | Bad |

In Table 1, the received frame rate refers to the number of frames of video data that are successfully transmitted over the channel in a predetermined period of time, such as a number of frames per second (FPS). The constant frame transmission interval refers to the expected amount of time that passes between the transmission of successive frames of video in a video sequence, which includes the transmission time and additional time periods between transmissions of packets or when the transmitter is unable to transmit due to noise in the channel. For a given target frame rate, the constant frame transmission time refers to the ideal amount of time that should pass between receiving image frames to maintain the frame rate, such as a constant frame transmission time of 40 milliseconds at a frame rate of 25 FPS. In many wireless communication system embodiments, a video frame is transmitted as a set of multiple data packets, where each packet includes a portion of the data in the video frame. The wireless transmitter needs to transmit all of the packets in the image frame to the receiver successfully within the constant frame transmission interval to successfully maintain transmission of video at a predetermined frame rate.

The average frame transmission time refers to the actual average amount of time required to transmit each image frame, which is ideally shorter than the constant frame transmission time that is required to maintain a predetermined frame rate. The average channel access delay refers to an average delay time period between when a transmitter is prepared to transmit a packet of data in a video frame and when the channel is available to enable the transmitter to begin transmission. Excessive noise levels or the presence of other transmitters that use the channel result in larger average channel access delays since the transmitter must wait until the channel is available to begin transmission. The average interval time is affected by the frame rate for transmission of the video frames (e.g. an interval of approximately 33.3 milliseconds for video at a rate of 30 frames per second) and by the average channel access delay.

The frame drop rate refers to a percentage of image frames that cannot be transmitted successfully from the transmitter to the receiver within the constant frame transmission interval for a predetermined frame rate. For example, at 25 FPS each image frame has a 40 millisecond period to be completely transmitted to the receiver before transmission of the next image frame commences. If conditions in the channel prevent the transmission of the entire frame within the 40 millisecond interval (e.g. only 50% of the frame is successfully transmitted), then the entire frame is dropped, the frame is not displayed, and transmission of the next frame begins. As described below, if too many frames are dropped, then at least one of the QoS parameters are reduced to enable the successful transmission of image frames at a reduced frame rate, image quality level, or image resolution level.

The CQIs in Table 1 are illustrative of different quality thresholds. The frame rate quality thresholds are exceeded when the average frame rate increases beyond predetermined threshold levels. The first average frame transmission time to constant frame time transmission interval has a quality threshold that is exceeded as the ratio decreases beyond predetermined threshold levels depicted in Table 1. The second average frame transmission time+average channel access delay to constant frame time interval ratio has another set of quality thresholds that are exceeded as the ratio decreases beyond the predetermined threshold levels depicted in Table 1. The percentage of dropped frames indicator has another set of quality thresholds that are exceeded as the percentage of dropped frames is reduced beyond the predetermined threshold levels that are depicted in Table 1. If the quality level of the channel deteriorates instead of improving, then one or more of the channel quality indicators described above drops below the predetermined threshold instead of exceeding the threshold and the CQI drops from good to acceptable or from acceptable to bad.

As used herein, the term "Quality of Service" refers to any property of a communication system that affects the perceived quality of transmitted data through the communication system. For example, in a wireless network system that transmits video data, the Quality of Service refers to the capability of the wireless network system to transmit video data at a particular frame rate with consistent frame times and with less than a predetermined maximum proportion of frames being lost or corrupted during transmission. Other parameters affecting the quality of service include the maximum resolution of video image data that the wireless communication system can transmit while maintaining the frame rate, and a tradeoff between image quality and compression ratio for transmitting image frames with a predetermined frame rate. Table 2 depicts examples of Quality of Service indicators for an exemplary video monitoring system that transmits video data through a wireless communication channel. Table 2 depicts examples of quality of service indicators in an approximate spectrum of "optimal," "operable," and "inoperable" operating conditions for an example wireless communication system.

TABLE 2

Quality of Service Indicators

| Parameter | Range | QoS Level |
|---|---|---|
| Frame Rate (frames/second) | ≥25 | Optimal |
| | ≥20 and <25 | Operable |
| | <20 | Inoperable |

TABLE 2-continued

Quality of Service Indicators

| Parameter | Range | QoS Level |
|---|---|---|
| % of Maximum Frame Resolution | ≥75% | Optimal |
| | ≥50% and <75% | Operable |
| | <50% | Inoperable |
| Encoding Quality level (JPEG) (0.0 minimum quality, 1.0 maximum quality) | ≥0.5 | Optimal |
| | ≥0.25 and <0.5 | Operable |
| | <0.25 | Inoperable |

The QoS parameters that are listed in Table 2 are illustrative of frame rate, resolution, and frame quality parameters that are adjusted on an image by image basis to generate images that can be transmitted through a wireless channel successfully as the channel quality, which is identified by the measured CQIs, changes during operation of a backup camera. The quality of service parameters that are selected based on the identified CQIs are referred to as Selected Quality of Service Indicators. The SQIs control the particular QoS parameters that are either decreased or increased based on changes in the CQI state. Table 3 lists different scenarios for the SQI given an identified CQI. Different levels of channel quality can accommodate data transmission that meet different QoS levels for different aspects of the video stream including the frame rate, frame resolution, and image quality level.

TABLE 3

SQI vs. CQI System Parameter Adjustments Decision Matrix

| SQI State | CQI State | System Parameter Adjustments |
|---|---|---|
| Optimal | Good | No change. |
| Optimal | Acceptable | No change required, optional reduction in SQI parameters to improve CQI state. |
| Optimal | Bad | Reduce SQI parameters in predetermined order to increase CQI to acceptable level. |
| Operable | Good | Increase SQI parameters while CQI remains in the good state. |
| Operable | Acceptable | No change. |
| Operable | Bad | Reduce SQI parameters in predetermined order to increase CQI to acceptable level. |
| Inoperable | Good | Increase SQI parameters in predetermined order to increase QoS while maintaining CQI state at good or acceptable level. |
| Inoperable | Acceptable | Increase SQI parameters in predetermined order to increase QoS while maintaining CQI state at good or acceptable level. |
| Inoperable | Bad | System Inoperable, generate notification to vehicle operator. |

Table 3 lists general modifications that are applied to the QoS parameters to select an SQI that corresponds to the CQI for the channel to maintain transmission of video data at an acceptable quality. In the system 200, the transmitter 204 selects one or more QoS parameters to modify based on the identified state of the CQI for the channel and the current QoS parameters for the video stream. As described above, three illustrative QoS parameters that the transmitter 204 modifies for a video stream include the currently selected frame rate, frame resolution, and frame image quality for the video stream. Adjusting the QoS parameters enables the transmitter 204 to reduce or increase the bandwidth transmission requirements for the video stream to accommodate the constraints of the communication channel between the transmitter 204 and receiver 212 for different channel quality levels.

Figure 2:
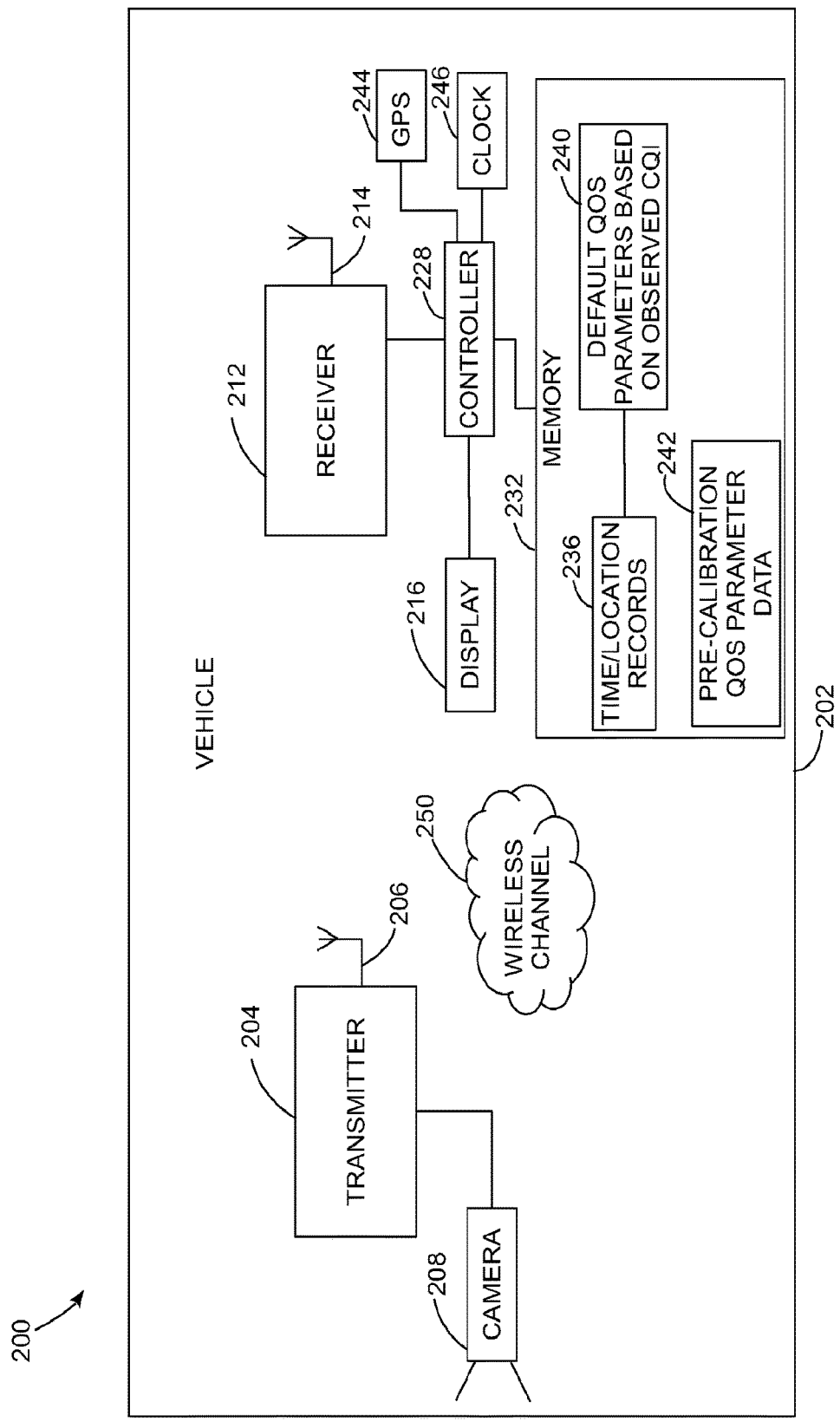
FIG. 2 is a schematic diagram of an exemplary wireless communication system that performs the process of FIG. 1.
Figure 3:
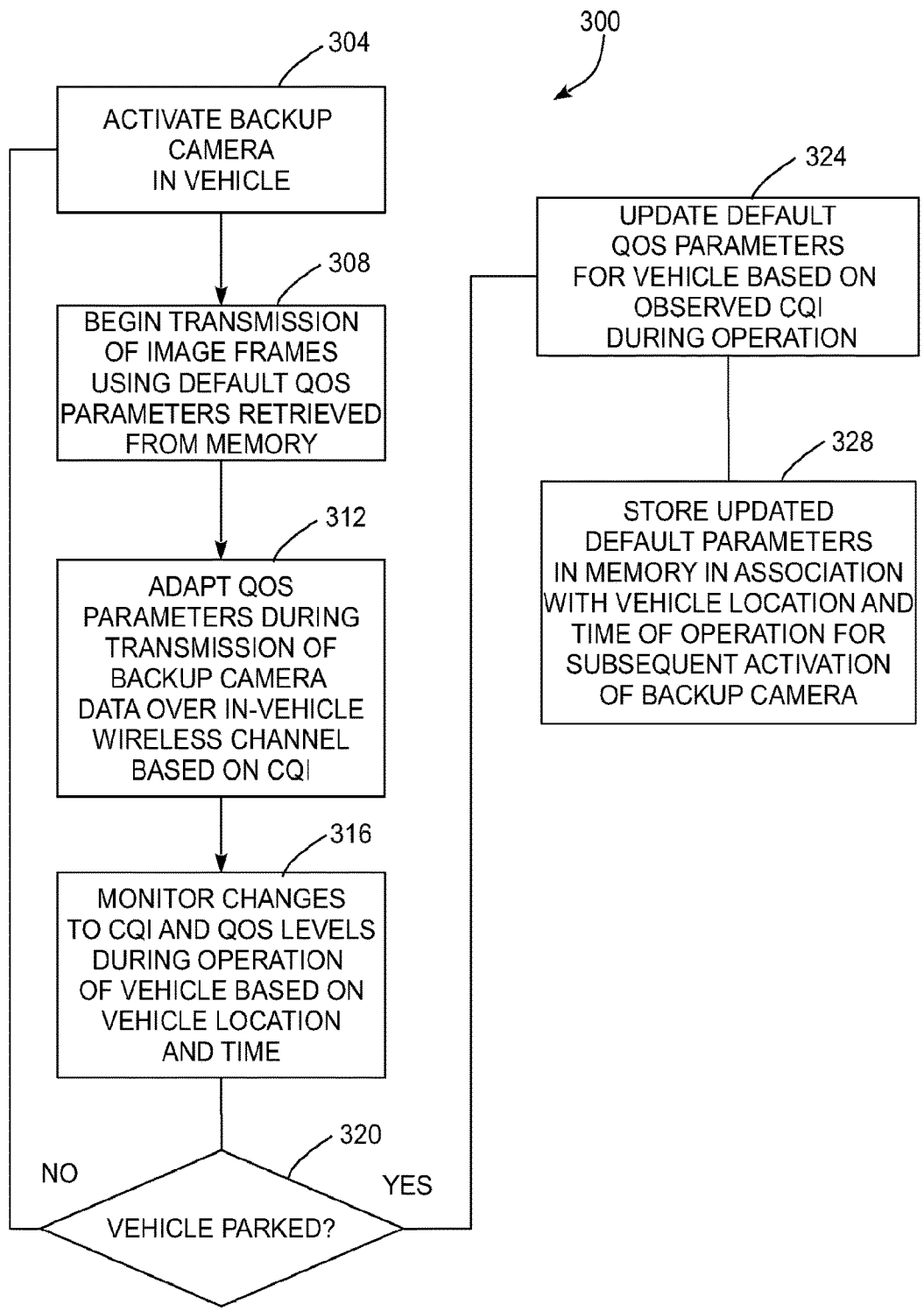
FIG. 3 is a block diagram of a process for updating a default QoS level to control transmission of image frames from the camera when the camera is first activated.

FIG. 2 depicts an illustrative embodiment of a wireless communication system 200 that is described in conjunction with the processes of FIG. 1 and FIG. 3. The system 200 is depicted as being integrated into a motor vehicle 202. The system 200 includes a transmitter 204, transmitter antenna 206, camera 208, receiver 212, receiver antenna 214, display device 216, controller 228, memory 232, a global positioning system (GPS) receiver 244, and a clock 246. The transmitter 204 is operatively connected to an antenna 206 and the camera 208. The receiver 212 is operatively connected to another antenna 214. The controller 228 is operatively connected to the receiver 212, display 216, and the memory 232. 2

The transmitter 204 communicates with the receiver 212 through a wireless communication channel 250 in the motor vehicle 202. While the terms "transmitter" and "receiver" are used in the description of FIG. 2 to distinguish the wireless devices operatively connected to the camera 208 and the controller 228, respectively, in the embodiment of FIG. 2 both the transmitter 204 and receiver 212 are wireless transceivers that are configured to both transmit and receive data. For example, the controller 228 operates the receiver 212 to transmit commands to the transmitter 204 to activate and deactivate the camera 208 and to adjust one or more QoS parameters for transmission of images from the camera 208 to the receiver 212. In some embodiments, the transmitter 204 and receiver 212 are each implemented using wireless transceivers that are configured for short-range wireless transmission through the vehicle 202. Examples of suitable transceivers include wireless local area network (WLAN) transceivers in the IEEE 802.11 family of protocols, Bluetooth transceivers, ultra wideband (UWB) transceivers, and the like.

The camera 208 generates video data of a scene, such as a region outside of the motor vehicle 202. In one embodiment, the camera 208 is a digital "backup" camera that generates images of the region behind the vehicle. The backup camera 208 generates a series of images and the transmitter 204 transmits the each image through the wireless channel 250 as a series of packets using, for example, the internet protocol (IP) and transmission control protocol (TCP) or user datagram protocol (UDP) protocols. The system 200 can be incorporated in a motor vehicle or in any other environment for wireless communication. The camera 208 generates compressed images using, for example, the JPEG format or other suitable image compression formats. The camera 208 generates each compressed image individually without buffering a segment of multiple frames together. Consequently, each image that is transmitted to the receiver 212 for display with the display device 216 can be displayed without buffering or other dependencies upon previously generated images during the operation of the camera 208. As described in more detail below, the camera 208 adjusts the selected frame rate, compression level/image quality level, and resolution of the generated image frames based on QoS parameters that are selected to enable transmission of the images through the wireless channel 250 to accommodate variations in the channel quality between the transmitter 204 and the receiver 212. The controller 228 decodes the image frame data from the receiver 212 and displays the image frame with the display device 216. When the image frames arrive at regular intervals from the transmitter 204, the controller 228 displays a series of images in a video playback that depicts motion in the environment behind the vehicle 202. While the system 200 is depicted in a configuration for transmitting video data from the transmitter 204 to the receiver 212, alternative embodiments include wireless communication systems that transmit other forms of information while adjusting QoS parameters to maintain communication over communication channels with varying channel quality properties.

In the system 200, the transmitter 204 includes a combination of hardware and software components that receive a digitized version of the video from the camera 208 and transmits a signal including the video data through the antenna 206. Either or both of the transmitter 204 and camera 208 include processing hardware to adjust a selected frame rate, image resolution, and image compression/quality level of the video data to adjust the amount of data that are transmitted to the receiver 212. The receiver 212 receives packets of data from the transmitter 204 that correspond to compressed image data for images that the backup camera 208 generates for the region behind the vehicle 202 from the transmitter 204 through the receiver antenna 214. The receiver 212 receives packets for each frame of image data for display through the display device 216, which is typically an LCD or other visual display device in the vehicle. In some embodiments, the transmitter 204 and receiver 212 are transceiver devices that can both send and receive data in the wireless communication system 200. The transmitter 204 receives signals in the wireless communication channel to identify sources of noise, and the transmitter receives messages sent from the receiver 212 that indicate success or failure of data transmission in the system 200. In addition to receiving data from the transmitter 204, the receiver 212 transmits acknowledgment messages to the transmitter 204 to indicate success or failure of transmitted data, and the receiver 212 optionally transmits data corresponding to channel quality indicators to the transmitter 204.

In the system 200, the controller 228 is a digital microprocessor, microcontroller, field programmable gate array (FPGA), application specific integrated circuit (ASIC) or any other digital processing device that is suited to control the generation, transmission, and display of image data from the camera 208 using the display device 216. The memory 232 includes both volatile data storage devices such as random access memory (RAM) and non-volatile data storage devices such as solid-state memory devices or magnetic disks. The controller 228 executes stored program instructions to operate the receiver 212 and display 216. The controller 228 further sends instructions to the camera 208 through the receiver 212 and transmitter 204 to control the operation of the camera 208. More particularly, the controller 228 identifies CQIs for the channel 250 based on the transmission characteristics of the transmitter 204, which include the rate of successful packet and image frame transmissions and the level of packet loss due to noise or other interference in the channel 250. The controller 228 generates commands to activate and deactivate the camera 208, and the controller 228 uses the receiver 212 to transmit selected QoS parameters to the transmitter 204 and camera 208 to control the frame rate, resolution, and image quality levels of the images that the camera 208 generates during operation of the system 200.

FIG. 1 depicts a process 100 for adjusting the operating parameters of a wireless transmitter to maintain a flow of data, such as image frame data, through a communication channel that exhibits varying levels of channel quality. In the description below, a reference to the process 100 performing an action or function refers to the execution of stored program instructions by a processor or controller, such as the controller 228, to perform the function or action in conjunction with other components in a vehicle. The process 100 is described in conjunction with the system 200 of FIG. 2 for illustrative purposes.

During process 100, the wireless communication system monitors changes to the identified CQI in a wireless communication channel between the transmitter and the receiver. The wireless communication system adjusts one or more parameters for transmitting data to maintain a maximum QoS level for transmission of a data stream, such as video data, through the channel based on the identified CQI. If the CQI parameters in the channel indicate degraded channel quality, the wireless transmission system lowers one or more QoS parameters to enable transmission of video data with a lower quality through the channel. During process 100, if the CQI parameters in the channel indicate increased channel quality, the wireless transmission system increases one or more QoS parameters to enable transmission of video data with a higher video quality through the channel. In the description of FIG. 1, a reference to the process 100 performing an action or function refers to the operation of one or more processors, such as microprocessors in a transmitting or receiving device, executing programmed instructions to operate one or more components to perform the action or function.

Process 100 begins as the camera 208 generates a compressed frame of image data using a resolution and image quality level that corresponds to currently selected QoS parameters (block 104). As described above, the camera 208 generates the frame as a single image that is compressed using a single-frame compression technique such as JPEG compression. The compression is typically a "lossy" compression process where the compressed image is not an exact duplicate of the image data from the sensor in the camera 208, but still gives a clear photographic indication of the environment at the rear of the vehicle 202. As the level of compression increases, the size of the data required to represent the image decreases, but the quality of the image also suffers due to an increasing loss of data from the original image due to the increased level of compression. In one configuration, during initial activation of the camera 208 to generate the image frames, the QoS parameters are set to predetermined default values, such as an intermediate image resolution and intermediate compression quality level for the camera. In another configuration, the controller 228 transmits a set of initial QoS parameters to the camera 208 when the camera 208 is activated, and the camera 208 generates the image frames using the QoS parameters that are received from the controller 228. As described in more detail below, as the system 200 performs the process 100 to generate and transmit multiple frames of video, the controller 228 identifies changes in the CQIs for the channel 250 to identify the selected QoS parameters for the generation of image frames should be increased or decreased to maintain transmission of a stream of image frames to the display 216.

Process 100 continues with transmission of the compress frame of image data. During process 100 the transmitter identifies an available sub-channel with a minimum amount of interference and selects the sub-channel for use in transmitting data to the receiver (block 108). In the illustrative embodiment of the system 200, the transmitter 204 and receiver 212 are each configured to select a frequency sub-band from a larger spectrum of available frequency bands to use for transmission of the image frames. The transmitter 204 and receiver 212 each sense the presence or absence of other wireless transmissions on each sub-channel and detect the level of noise in each sub-channel. The transmitter 204 and receiver 212 then send and receive packets to select a sub-channel from the plurality of available sub-channels. In alternative embodiments, sub-channels include different time slots in a time-division multiple access system, or different codes in a code-division multiple access system. The transmitter 204 monitors available sub-bands for interference from, for example, other wireless transmitters or electrical noise from sources around the system 200. The transmitter 204 selects a frequency sub-band with a minimum amount of identified noise.

Process 100 continues as the transmitter 204 begins transmission of packets at a maximum operational power level and then reduces the transmission power level in response to feedback from the receiver 212 to maintain the power level for transmission for the packets that include data for the image frame with a signal to noise ratio (SNR) of 6 dB above the ambient noise level in the selected sub-channel (block 112). Over time the receiver 212 identifies a signal-to-noise ratio (SNR) of the signal from the transmitter 204 in the selected sub-channel. If the SNR is greater than a predetermined value (e.g. 6 dB above the noise floor), then the receiver 212 optionally sends a message to the transmitter 204 to enable the transmitter 204 to increase one or more QoS parameters. Similarly, if the SNR is below the predetermined value, the transmitter 204 reduces one or more QoS parameters to accommodate the noisy sub-channel or increases the transmission power. Additionally, in some embodiments the transmitter 204 employs other hardware-based techniques for improving the SNR, such as adaptive beam-forming techniques. In some embodiments, the receiver 212 also transmits acknowledgement packets to the transmitter 204 that enable the transmitter to identify if the receiver 212 has received a frame of image data successfully and to identify the effective throughput of image frame data through the channel 250. During operation of the system 200, the sub-channel selection and transmission power selection portions of the process 100 of blocks 108-112 are not necessarily performed for the transmission of each frame of video data. Instead, the system 200 performs the sub-channel selection and power selection processes at the beginning of a video transmission sequence and then only when required due to changes in the conditions of the channel 250 during the transmission of image frames. The transmitter 204 continues to transmit packets of data that comprise the image using the maximum available packet transmission rate and packet size that is available for transmission through the sub-channel to complete the transmission of the image frame (block 116).

During process 100, if the receiver 212 receives the transmitted frame of video data within the constant frame transmission interval for the currently selected video playback frame rate, then the controller 228 decodes the image frame data and displays the image frame data with the display device 216 using an averaged frame resolution (block 118). In the system 200, the display 216 is configured to display different resolutions of images that are received from the camera 208. The resolution of the images that are received from the camera 208 may vary based on changes to the QoS parameters for image frame generation due to variations in the channel quality. For example, a series of image frames might include image frames that vary between 1920×1080, 1280×720, and 640×480 pixel resolutions with the resolution increasing when the CQIs improve and decreasing when the CQIs deteriorate. Displaying a sequence of frames that have rapidly varying resolutions with the display device 216 could produce distraction to an operator who views the display 216. To reduce or eliminate the distraction caused by rapid variations in frame resolution, the controller 228 identifies one resolution in the most recently received plurality image frames that occurs with the greatest frequency, such as the most common resolution received in the last 5 to 10 seconds of video playback. The controller 228 then scales all of the image frames to the identified resolution to reduce operator distraction. For example, if the most commonly received images have a resolution of 640×480 pixels, then the controller 228 displays all image frames from the camera at the 640×480 pixel resolution. When the receiver 212 receives 1920×1080 or 1280×720 pixel resolution images from the camera 208, the controller 228 scales the higher-resolution images to maintain the 640×480 display. In another situation, the controller 228 scales a lower resolution image to a higher resolution to maintain display of images with a consistent resolution, although scaling the lower resolution image to a higher resolution may reduce the image quality. If the most common resolution of the image frames changes over a comparatively long period of time, then the controller 228 optionally changes the display resolution to the updated resolution, but the controller 228 only changes the display resolution infrequently to prevent driver distraction.

Process 100 continues as the controller 228 identifies CQIs in the channel 250 during the transmission of the image frame of process 100 to identify if the CQIs in the channel 250 provide at least an acceptable level of channel quality to maintain transmission of image frames using the presently selected QoS parameters (block 120). The controller 228 identifies the CQIs based both on the transmission of the image frame that is generated during block 104, and with reference to previous image frames (if any) that have been transmitted since activation of the camera 208. For example, the frame transmission time and channel access delays for the transmission of the packets for the most recent image frame provide the controller 228 with information about the amount of time required to transmit the most recent image frame, which also affect the average frame rate and transmission times for a series of frames of the image data. The interval between transmission of the most recent frame and the previous frame affects the average frame transmission interval time and average frame reception interval time.

Figure 4:
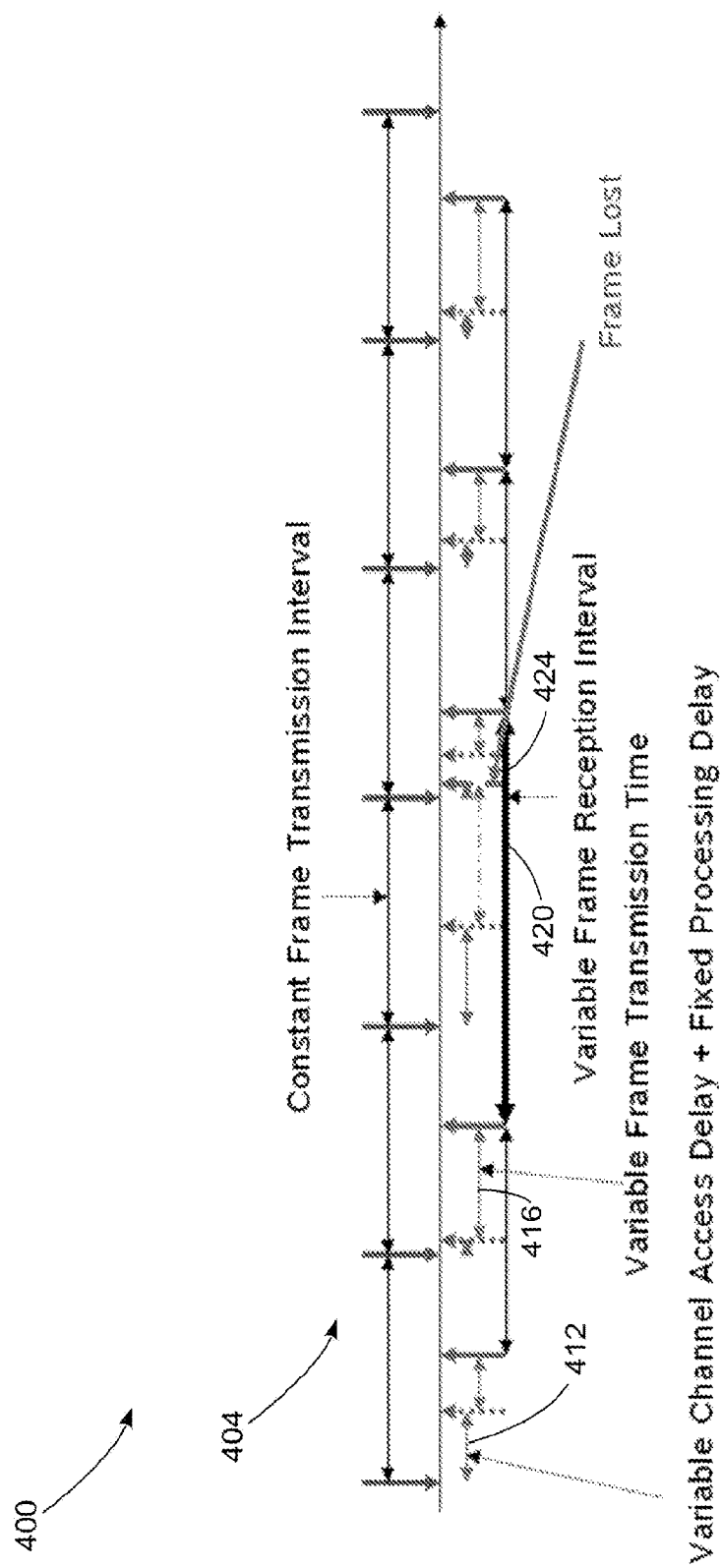
FIG. 4 is a timing diagram depicting the transmission of video frame data using a wireless communication network.

During process 100, if the controller 228 identifies at least one CQI for the channel 250 that is in the "bad" range below acceptable levels, then the controller 228 updates the SQIs to reduce at least one QoS parameter for the generation and transmission of subsequent image frames from the camera 208 (block 124). FIG. 4 depicts a timing diagram 400 for transmission of a series of image frames that form a video stream. In FIG. 4, the constant frame transmission interval 404 corresponds to an ideal transmission of video frames in an isochronous manner. That is to say, each video frame is transmitted in a fixed amount of time, and the time interval between video frame transmissions is fixed so that frames are sent at a consistent rate with a consistent latency to avoid jitter. During actual transmission of the video frames, however, the amount of time required to transmit each frame of video data varies. For example, the data comprising a frame of video data are typically divided into multiple packets for transmission, and the processing required for transmission introduces a fixed time delay 412. The processing of the video data, including encoding and compression, combined with the network processing for the video data introduce variations into the total transmission time for each video frame, as depicted by the variable transmission times 416. The time for receiving a video frame at the receiver 212 also varies as depicted by the variable frame reception times 420.

In some cases, if the CQI in the channel drops below an acceptable level, one or more frames of video data are dropped. In FIG. 4, if the receiver 212 fails to receive a full frame of video data before the transmitter 204 begins transmission of the next frame in the video sequence, then the frame is considered lost, as depicted at time 424 in FIG. 3.

In one embodiment, the controller 228 generates a command message for the transmitter 204 to first select a reduced frame rate, select reduced image quality, and finally select a reduced image frame resolution for subsequent image frames for the SQI to enable transmission of subsequent frames within the bounds of the identified channel quality. For example, if the maximum frame rate of the camera 208 is 30 FPS, then the transmitter 204 first reduces the transmission frame rate from the maximum 30 FPS or another currently selected frame rate to a predetermined minimum frame rate (e.g. 20 FPS). In one embodiment, the camera 208 generates image frames at the reduced rate, while in another embodiment the camera 208 continues to generate frames at a predetermined rate (e.g. 30 FPS) while transmitter 204 only transmits frames at predetermined intervals to effectively reduce the rate of frame transmission to the receiver 212. If the frame rate has already reached the predetermined minimum frame rate, then the transmitter 204 adjusts the encoding of the image data to increase the level of compression. As is known in the art, increasing the level of compression for an image frame reduces the number of bits in the frame, which correspondingly reduces the required transmission time for the frame. However, a reduction in image quality also introduces compression artifacts into the image that reduce the overall perceptible quality of the image. In one embodiment, the camera 208 includes a light sensor or other image processing devices that select a minimum acceptable level of image quality based on the amount of ambient light around the vehicle to determine a maximum level of compression that can be applied to the image frame while maintaining a minimum level of contrast in the image frame that is transmitted to the display 216. If both the frame rate and image quality are at minimum levels, then the controller 228 instructs the camera 208 and transmitter 204 to encode the image frames at a reduced resolution level. For example, if the camera 208 can generate images at resolutions of 1920×1080 pixels, 1280×720 pixels, or 640×480 pixels, then the camera 208 generates subsequent image frames first at the highest resolution (1920×1080) and then at progressively lower resolutions if the identified CQIs do not permit transmission of images at the highest quality levels.

Under some conditions, the controller 228 identifies CQIs for the channel 250 that are in the acceptable range for continued transmission of subsequent image frames using the currently selected QoS parameters for image frame rate, frame compression quality, and frame resolution (block 120). In some instances, the controller 228 further identifies that the selected QoS parameters for the frame transmission are at or near the limit of the channel 250 (block 128) and the camera 208 and transmitter 204 continue to transmit subsequent frames using the presently selected QoS parameters (block 136). In some instances where the QoS parameters at least one of the frame rate, compression quality, or resolution are in the acceptable or sub-optimal range, the controller 228 can identify that the CQIs for the channel would permit an increase in at least one QoS parameter (block 128). For example, if the controller 228 identifies that the transmission of frames over a predetermined period of time (e.g. 10 seconds) with the current QoS parameters has exceeded each of the CQI parameters that are listed in Table 1 at the current QoS levels, then the controller 228 increases one or more QoS parameters for subsequent image frames (block 132). The controller 228 increases the QoS parameters gradually until either all of the QoS parameters for frame rate, frame quality, and frame resolution are at optimal levels or until the controller 228 identifies that the maximum QoS parameters have been found for the present quality conditions in the channel 250.

While process 100 is described in conjunction with the transmission of a single frame of image data, the system 200 repeats the process 100 to transmit a series of image frames from the camera 208 to the display 116. The controller 228 continues to adjust the QoS parameters for the camera 208 to adjust for variations in the CQI that are detected for the channel 250. During process 100, the transmitter adjusts the operating parameters described above to maintain the CQI at an acceptable level for a given Quality of Service selection. For example, the activities of one or more transmitters that share a channel affect the CQI. An individual transmitter may not receive a valid acknowledgement message of transmitted packets due to multiple reasons such as receiver not being available or being deactivated, channel fading, channel obstruction, and receiver node being in communication range of another transmitter on same channel, which is referred to as the hidden terminal problem. During process 100, an extended transmit duration may lead to transmission starvation due to proactive channel avoidance and/or increase in hidden terminal problem when transceivers in multiple vehicles transmit using the same channel. In either case, the application layer software perceive this channel as bad since desired QoS requirements cannot be met on this channel. Thus, even though the selected QoS parameters are within the carrying capacity of the channel for a single transmitter and receiver, the presence of several transceivers in one or more vehicles that share a common channel reduces the effective channel capacity for the vehicles and requires that adaptation of the QoS parameters based on the current CQI information.

As described above, the process 100 enables the system 200 to adapt the QoS parameters for wireless transmission of image frames based on changes in the CQI parameters in the channel 250. Additionally, during operation the system 200 selects initial QoS parameters that enable the display 216 to receive image frames from the camera 208 with minimal delay to enable an operator in the vehicle 202 to view backup camera images. One technique for selecting initial QoS parameters for transmission is a pre-calibration technique. In the pre-calibration technique, the system 200 applies modifications to the QoS parameters in order of interference and identifies CQI parameters and SNR for various combinations of QoS parameters and radio link parameters such as transmit power, data rate and channel frequency. The controller 228 stores the pre-calibration data in the memory 232 as pre-calibration data 242 for use in modifying the QoS parameters during operation. The pre-calibration information is used to modify the QoS and radio link parameters to a configuration that provides acceptable performance during interference in the communication channel. The pre-calibrated QoS and radio link parameters are arranged in a Euclidean space with the selected changes to the QoS parameters being selected with reference to a minimum Euclidean distance to the current values as a base set. The updated QoS and radio link parameters set, which include better QoS values to accommodate the identified CQI for the channel and minimum Euclidean distance to the selected base set. If the measured CQI remains unacceptable after the update, then the transmitter 204 uses the modified QoS parameters as a new base set and continues the process of identifying QoS values in the pre-calibration table until exhaustion of the pre-calibration values.

Alternative techniques for setting the initial QoS parameters include machine learning techniques. The machine learning techniques modify the QoS adjustment parameters that are stored in the pre-calibration table through dynamic updates to the QoS parameters based on the observed behavior of the system 200. During a machine learning process, the transmitter 204 readjusts the calibrated values in response to receiving different CQI for selected QoS and radio link parameters that are selected from the pre-calibration table. In one embodiment, the machine learning process applies weighting factors to the adjustment to provide 50% weight to the original value and 50% weight to the new value to ensure stability while updating the QoS adjustment parameters. Alternatively, the machine learning process identifies an effect on the CQI for a given SQI and the radio link parameters as a function of SNR or received signal strength. The transmitter 204 stores a plurality of calibration tables corresponding to different SNR values and selects parameters from a table having the closest and greater SNR value to the observed SNR value in the channel. The machine learning process also identifies patterns in the variations of the each parameter value to achieve a selected CQI and without the requirements of a predetermined pre-calibration table. Instead, the transmitter 204 identifies co-efficient value for each QoS and radio link default parameter value as a function of CQI and SNR (or received signal strength). These respective co-efficient values for the parameters change.

FIG. 3 depicts an illustrative embodiment of a machine learning process 300 that identifies QoS parameters for use in the system 200 based on a history of observed CQI and corresponding QoS parameters in the system 200 during operation of the vehicle 202 in different locations and at different times. In the discussion below, a reference to the process 300 performing an action or function refers to the execution of stored program instructions by a controller, such as the controller 232, to perform the function or action in conjunction with one or more components in the vehicle. Process 300 is described in conjunction with the system 200 of FIG. 2 for illustrative purposes.

Process 300 begins with activation of the backup camera 208 (block 304). In the system 200, the controller 228 activates the camera 208 in response to the vehicle 202 being placed into a reverse drive gear or upon another request from a vehicle operator for a view from the rear of the vehicle. The system 200 then begins transmission of the image frames using default QoS parameters that are retrieved from the memory (block 308). In one embodiment, the default QoS parameters include the pre-calibration QoS parameter data 242. In another embodiment, the pre-calibration QoS parameter data 242 includes the last-known QoS parameters that were used before the vehicle 202 was parked. As described below, when the vehicle is parked, the QoS parameters in use just before the vehicle is deactivated are stored to the memory 232, and in one embodiment the same pre-calibration QoS parameter data 242 are retrieved from the memory 232 to initialize transmission of images from the camera 208 to the display 216 with a minimal delay after the vehicle 202 is activated.

In another embodiment, the controller 228 identifies a location of the vehicle 202 using the GPS 244 and the current time using the clock 246. If the memory 232 includes a record of the vehicle location and optionally time in the time/location records data 236, then the controller 228 retrieves the default QoS parameters 240 that correspond to a history of CQI information that have been observed when the vehicle 202 is in the currently detected location. The time parameter refers to a time of day or day of week information that corresponds to cycles of activity for wireless sources around the vehicle 202. For example, when the vehicle drives to a particular parking lot in the early morning, the level of interference from surrounding wireless devices may be low and the CQI levels recorded at the particular location of the parking lot in the early morning hours enable the system 200 to operate with optimal QoS parameters. However, in the afternoon the same parking lot is busy, and the presence of wireless transmitters reduces the CQI and corresponding QoS parameter levels. The controller 228 identifies previous records 236 for both the time and location of the vehicle 202 in the memory 232 that correspond to the previously identified QoS parameters 240 and initializes the camera 208 and transmitter 204 to use the stored QoS parameters.

Process 300 continues as the system 200 adapts QoS parameters during the transmission of image data from the backup camera 208 over the in-vehicle wireless channel 250 (block 312). The system 200 performs the processing that is described above in the process 100 of FIG. 1 to for each frame of video data that is transmitted during the processing of block 312. During the process 300, the controller 228 also monitors the location of the vehicle 202 using the GPS 244 and the time of day during which the vehicle 202 is being operated using the clock 246 concurrently with the adaptive QoS processing in block 312 (block 316). The controller 228 stores the recorded QoS parameters in the memory 232 in associated with the recorded location and time data to update the history of recorded locations and times 242 and corresponding QoS parameter data 240. In some embodiments, the controller 228 generates a time-weighted average of QoS levels that are observed at the same location during similar times of day to generate QoS parameters that are commonly observed at a particular location and at a particular time of day corresponding to the driving patterns of the vehicle 202. The controller 228 uses the stored location and time information to retrieve the corresponding QoS parameter data 240 from the memory 232 if the camera is activated while the vehicle is in operation at a particular location or at a particular location during a particular time of day. The initial QoS parameters that are stored in the memory 232 enable the system 200 to display the video with minimal delay when the CQI in the vehicle and corresponding selected QoS parameters for the vehicle 202 are similar to previously observed conditions that occurred at a particular location in the past.

Process 300 continues with the processing that is described in blocks 304-316 until the vehicle 202 is parked (block 320). When the vehicle 202 is parked, the controller 228 updates the default QoS parameters for the transmission of image frames from the camera 208 based on the observed CQIs and corresponding QoS parameters that were used during the previous operation of the vehicle 202 (block 324). The controller 228 then stores the updated default QoS parameters in the memory 232 for use when the vehicle 202 is reactivated (block 328). When the vehicle 202 is reactivated, the controller 228 can use the stored QoS parameters to initialize the transmission of image frames from the camera 208 to the display 216 with minimal delay since embodiments that rely on the GPS device 244 to identify the location of the vehicle may take several seconds to become operational when the vehicle is initially started.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method of operating an in-vehicle video monitoring system comprising:
   generating with a camera in a vehicle a first image frame of an environment exterior to the vehicle, the first image frame having a first resolution and first image quality level;
   transmitting with a transmitter operatively connected to the camera the first image frame to a receiver through a wireless channel;
   generating with the camera in the vehicle a second image frame of the environment exterior to the vehicle, the second image frame having the first resolution and first image quality level, the second image being generated after generation of the first image frame and after the transmitter beings transmitting the first image frame to the receiver;
   transmitting with the transmitter operatively connected to the camera the second image frame to the receiver through the wireless channel after the first image frame is transmitted to the receiver;
   displaying with a display device in the vehicle the first image frame and the second image frame received by the receiver, the second image frame being displayed after the first image frame;
   identifying with a controller operatively connected to the receiver a plurality of channel quality indicators, corresponding to:
      an average frame rate corresponding to the received transmissions of the first and second images;
      a first ratio corresponding to an average frame transmission time for the first image frame and the second image frame to a constant time interval for frame transmission corresponding to a first selected rate of frame transmission from the transmitter;
      a second ratio corresponding to a sum of the average frame transmission time with an average channel access delay for the first image frame and the second image frame to the constant time interval for frame transmission;
   generating with the controller a command to reduce at least one of a frame transmission rate, frame resolution, and frame quality level for a subsequent frame from the camera in response to at least one of the plurality of channel quality indicators being beneath a predetermined quality threshold;
   transmitting with the receiver the command to the transmitter and the camera; and
   transmitting with the transmitter a third image frame from the camera a second selected frame rate that is less than the first selected frame rate in response to the command.

2. The method of claim 1, the transmission of the first image further comprising:
   selecting with the transmitter and the receiver a sub-channel in the wireless channel having a minimum level of interference relative to at least one other sub-channel in the wireless channel; and
   transmitting with the transmitter the first image to the receiver using the selected sub-channel.

3. The method of claim 1, the transmission of the first image further comprising:
   transmitting with the transmitter the first image to the receiver using a plurality of packets, each packet including a portion of data in the first image and a first packet in the plurality of packets is transmitted at a maximum power level for the transmitter;
   receiving with the transmitter a message from the receiver indicating a signal to noise ratio (SNR) of the first packet at the receiver; and
   transmitting with the transmitter at least one subsequent packet in the plurality of packets a reduced power level from the transmitter in response to the message from the receiver indicating that the SNR of the first packet exceeds a predetermined threshold.

4. The method of claim 1 further comprising:
   generating with the camera the third image frame of the environment exterior to the vehicle, the third image frame having at least one of a second image quality level that is less than the first image quality level and a second resolution that is less than the first resolution in response to the command from the controller.

5. The method of claim 1 further comprising:
   generating with the controller another command to increase at least one of the frame transmission rate, frame resolution, and frame quality level for another subsequent frame from the camera in response to each of the plurality of channel quality indicators being above the predetermined quality threshold;
   transmitting with the receiver the other command to the transmitter and the camera; and
   transmitting with the transmitter a fourth image frame from the camera at an increased average frame rate from the average frame rate corresponding to the received transmissions of the first and second images in response to the command.

6. The method of claim 5 further comprising:
   generating with the camera the fourth image frame of the environment exterior to the vehicle, the fourth image frame having at least one of a second image quality level that is greater than the first image quality level and a second resolution that is greater than the first resolution in response to the other command from the controller.

7. The method of claim 1 further comprising:
   identifying with a global positioning system device in the vehicle a location of the vehicle; and
   generating with the controller another command specifying the frame transmission rate, frame resolution, and frame quality level for generation of the first image frame and the second image frame with reference to predetermined frame transmission rate, frame resolution, and frame quality level for generation that are stored in a memory in association with the location of the vehicle identified by the global positioning system;
   transmitting with the receiver the other command to the transmitter and the camera;
   generating with the camera the first image frame and the second image frame having the frame resolution and the frame quality level specified in the other command; and
   transmitting with the transmitter the first image frame and the second image frame at the frame transmission rate specified in the other command.

8. The method of claim 7 further comprising:
identifying with a clock in the vehicle a time of day; and
generating with the controller the other command specifying the frame transmission rate, frame resolution, and frame quality level for generation of the first image frame and the second image frame with reference to predetermined frame transmission rate, frame resolution, and frame quality level for generation that are stored in a memory in association with the location of the vehicle identified by the global positioning system and the time of day identified by the clock.

9. The method of claim 1, further comprising:
identifying with the controller a plurality of frame resolutions for a plurality of image frames received with the receiver prior to receiving the first image frame;
identifying with the controller one resolution in the plurality of frame resolutions that occurs with a greatest frequency; and
scaling with the controller the first image frame from the first resolution to the one resolution for display with the display device at the one resolution in response to the first resolution being different than the one resolution.

\* \* \* \* \*